Figure 1:
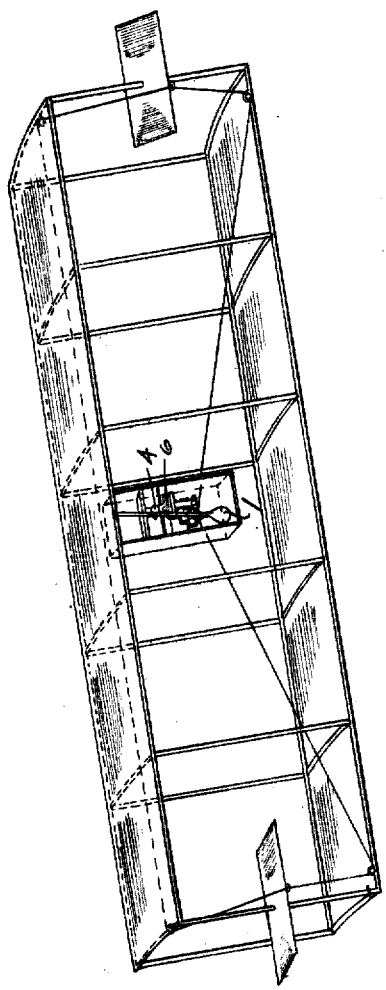

R. M. THOMPSON.
AUTOMATIC LATERAL BALANCE CONTROLLING DEVICE FOR FLYING MACHINES.
APPLICATION FILED JUNE 29, 1910.

1,003,670.

Patented Sept. 19, 1911.
4 SHEETS—SHEET 1.

Witnesses
M. J. McNeil
Fred Hall

Inventor
Robert M. Thompson

By
T. J. Elliott
Attorney

R. M. THOMPSON.
AUTOMATIC LATERAL BALANCE CONTROLLING DEVICE FOR FLYING MACHINES.
APPLICATION FILED JUNE 29, 1910.
1,003,670.
Patented Sept. 19, 1911.
4 SHEETS—SHEET 2.
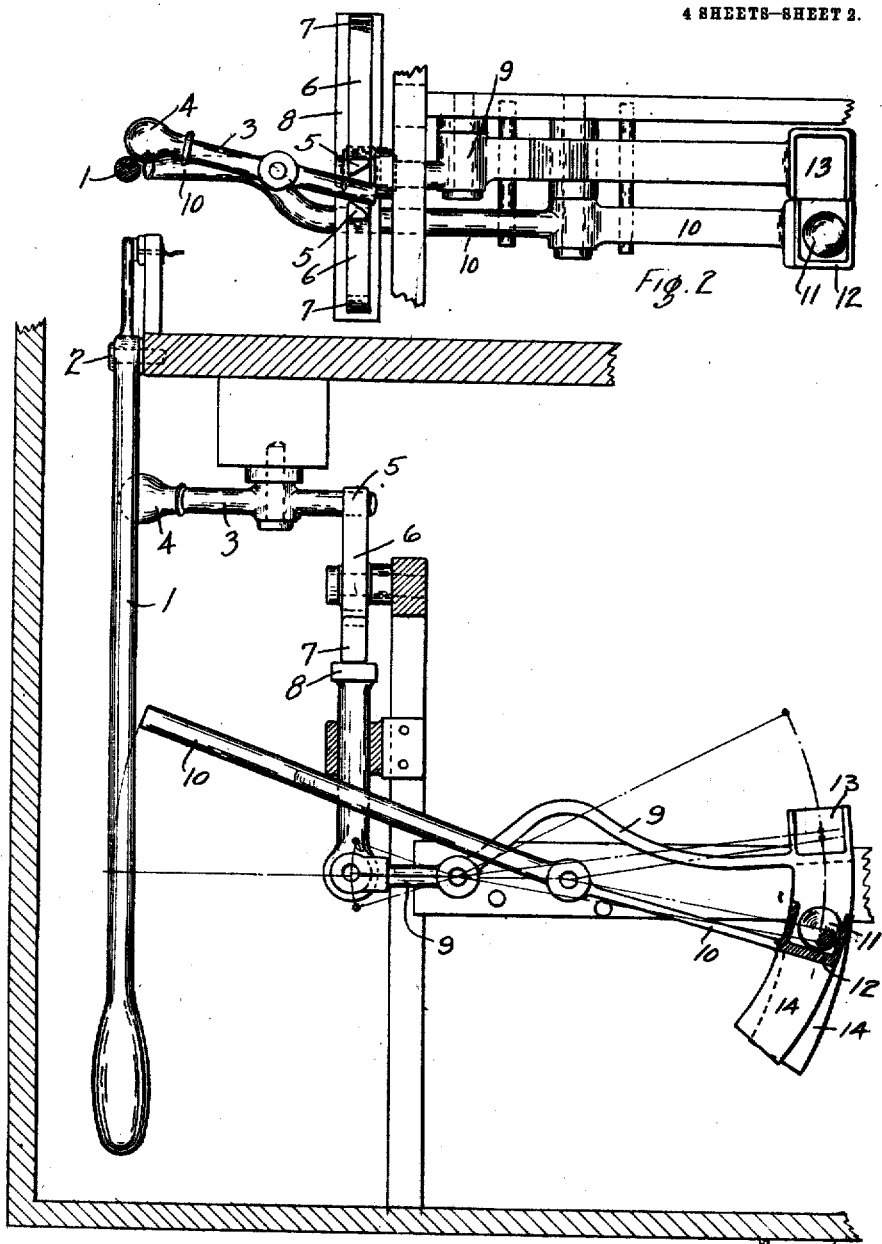
Witnesses
M. J. McNeil
Fred Hall
Inventor
Robert M. Thompson
By R. V. Elliott
Attorney R. M. THOMPSON.
AUTOMATIC LATERAL BALANCE CONTROLLING DEVICE FOR FLYING MACHINES.
APPLICATION FILED JUNE 29, 1910.
1,003,670.
Patented Sept. 19, 1911.
4 SHEETS—SHEET 3.
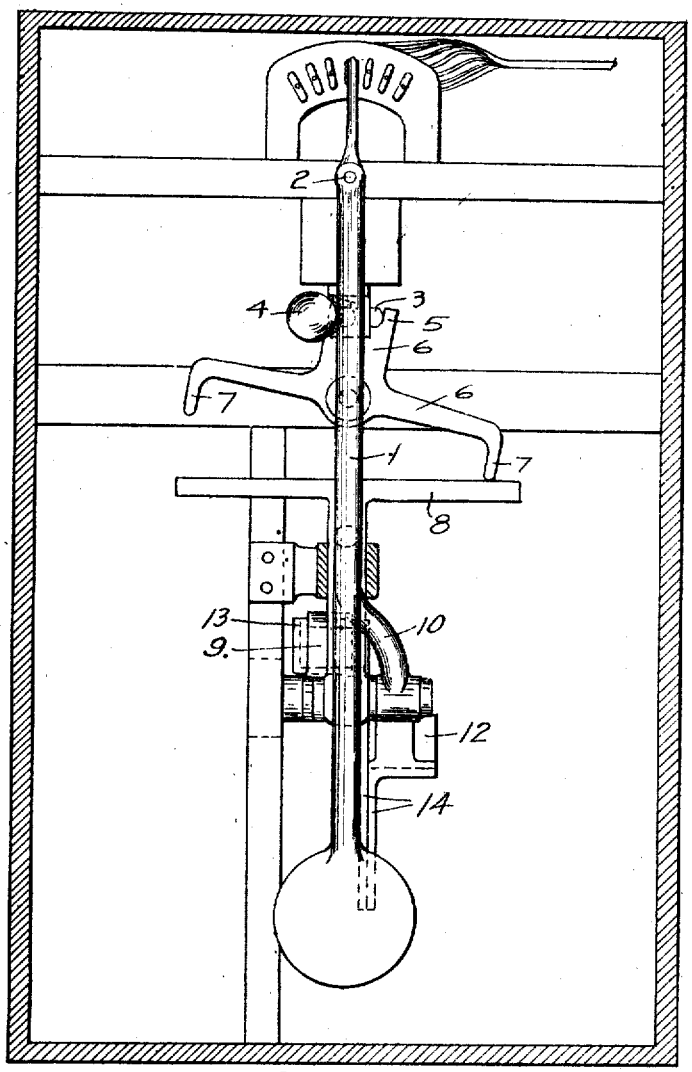
Fig. 4.
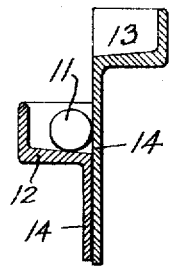
Fig. 5.
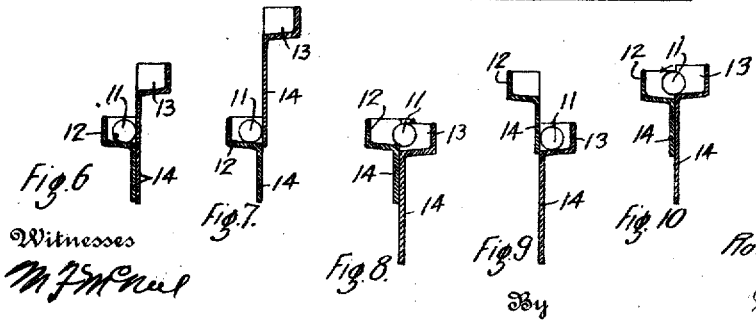
Witnesses
M. J. McNeil
Fred Hall.
Inventor
Robert M. Thompson
By P. J. Elliott
Attorney

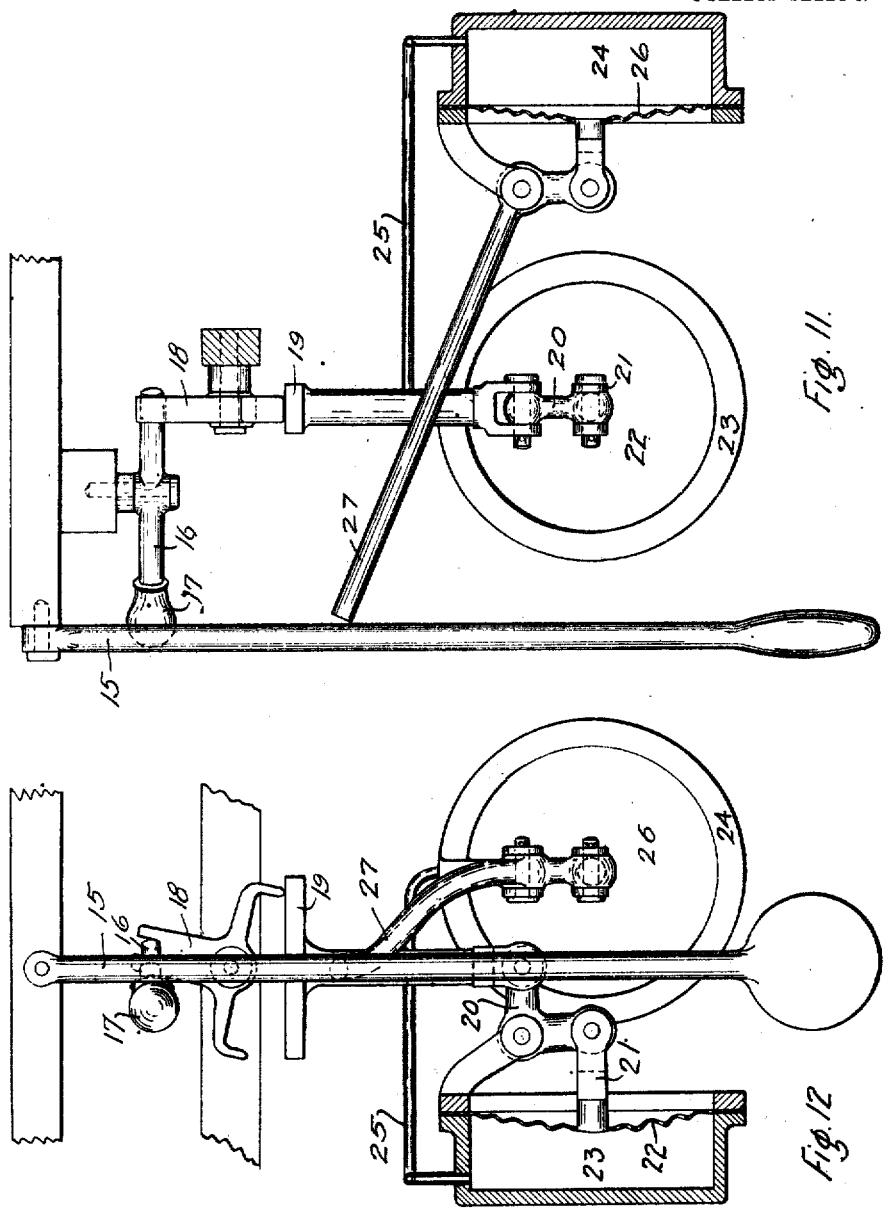

UNITED STATES PATENT OFFICE.

ROBERT M. THOMPSON, OF TACOMA, WASHINGTON.

AUTOMATIC LATERAL-BALANCE-CONTROLLING DEVICE FOR FLYING-MACHINES.

1,003,670.

Specification of Letters Patent. Patented Sept. 19, 1911.

Application filed June 29, 1910. Serial No. 569,415.

*To all whom it may concern:*

Be it known that I, ROBERT M. THOMPSON, a citizen of the United States of America, residing at Tacoma, in the county of Pierce and State of Washington, have invented certain new and useful Improvements in Automatic Lateral-Balance-Controlling Devices for Flying-Machines, of which the following is a specification, reference being had therein to the accompanying drawing.

This invention relates to devices for attaining automatic lateral balance in flying machines, and has for its objects to produce a means which will dampen the vibration of a controlling pendulum, whereby the oscillations thereof from one side to the other are prevented. I attain this and other objects by the devices, mechanisms and arrangements illustrated in the accompanying drawings, in which—

Figure 1 is a front elevation of the flying machine with my device mounted therein: Fig. 2 is a plan of a portion of the mechanism: Fig. 3 is a side elevation thereof: Fig. 4 is a front elevation thereof: Fig. 5 is a detailed cross section of the ball-holding cups: Figs. 6, 7, 8, 9 and 10 are similar views of said cups, showing them in various relative positions: Fig. 11 is a side elevation of a variation of the mechanism; and Fig. 12 is a front elevation thereof.

Similar numerals of reference refer to similar parts throughout the several views.

In order to preserve the lateral balance of a flying machine, it has been found necessary to provide certain corrective devices, whereby the machine is brought to the normal level, either when disturbed by eddies in the air, or on turning the machine from a straight course. This invention has nothing to do with the specific means whereby the flying machine is brought back to an even keel, but is simply a device for preventing the swinging of the pendulum past its neutral position, said pendulum having connection to the corrective means. In Fig. 1 this connection is shown as a positive wire connection, while in Fig. 4 is indicated an electric control connected to the pendulum, whereby the pendulum controls an electric current which in turn controls the corrective devices, through other well known mechanisms.

Referring now principally to Figs. 2 and 3 and 4, the pendulum 1 is hung within a suitable supporting and protecting box on a horizontal pivot 2 so as to vibrate in the plane in which the corrective action is to be effected and is connected, as above mentioned, by any suitable means to the corrective device of the flying machine. When the flying machine is steady, on an even keel, the pendulum 1 hangs vertically downward from the pivot 2 thereof. A horizontal lever 3 is secured by a vertical pivot to the frame in such position that the knob 4, formed on the end, is in the plane of vibration of the pendulum. The other end of the lever 3 engages the forked end 5 of the vertical double lever 6 so that if the lever 3 is moved in either direction the said lever 6 will be tilted on its pivot on one side or the other. This double lever 6 has two downward extensions 7 adapted to engage the upper surface of a T-bar 8, so that when the lever 6 is turned in either direction the T-bar 8 will be forced downward thereby against the upward force due to the weight of the hereinafter described cup 13 on the lever 9. This T-bar 8 is mounted so as to have vertical movement in a suitable socket supported by the frame and is connected at its lower end to a vertically acting lever 9 pivoted to the frame. This lever 9 carries at its other end one of the two ball-cups which will be described hereinafter. A stop bar 10 is pivoted to the frame so as to have vertical movement and is adapted to fall into the plane of vibration of the pendulum when the pendulum has been removed from its normal position. The stop bar 10 carries at its other end the other ball-cup. A ball 11 is provided of such weight as to raise the other end of the stop bar 10 when the ball is in the cup 12 secured thereto, and such that when the ball is removed from the cup 12 the stop bar will fall into the plane of vibration if the pendulum, so that when the pendulum swings to its neutral position it will hit the said stop bar, unless the stop bar has been removed out of the plane of vibration.

The cup 13, which is secured to the end of the lever 9 is mounted adjacent to the cup 12, both of said cups moving in substantially the same courses. The cups are three-sided, being open on their adjacent sides and have their lower surfaces inclined downward toward each other, so that the ball will always tend to roll out of the cup unless it is held therein by the other cup. Each cup has a downward extending plate 14 immediately below the said open side. The two plates 14 are in close proximity to each other and each is adapted to close the other cup and therefore to hold the ball 11 therein when the cup to which the plate is attached is above the cup containing the ball (see Figs. 5, 6, 7 and 9). The action of the devices is as follows:—When the pendulum is in its normal or neutral position, the lever 3 is on one side or the other of it and the knob 4 engages it. The lever 6 is therefore tilted to one side or the other and the T-bar 8 is somewhat depressed, and therefore the cup 13 is raised above its lowest point (Fig. 6). If the pendulum 1 swings away from the side on which the knob 4 engages it, the said knob will swing to the neutral or central position, through the action of the lever 6, which allows the T-bar 8 to rise under the action of the weight of the cup 13 and lowers the cup 13 (Fig. 8). In the meantime, the ball 11 has been held in the cup 12 as shown in Figs. 3 and 6, to hold the stop bar 10 out of the plane of vibration of the pendulum. If the displacement of the pendulum has been so small that the knob 4 has not been able to reach its central position, the ball remains in the cup 12 and the stop bar has therefore not been lowered into the plane of vibration. As soon however as the cup 13 is lowered to the position above indicated, the ball 11 rolls from the cup 12 and into the cup 13, thus allowing the stop bar 10 to drop into the plane of vibration of the pendulum (Fig. 9). When the pendulum has thus been displaced, it acts through any of the well known means on the corrective device and as said corrective means restores the level of the flying machine, it swings back toward its neutral position. If it swings quickly, it will engage the stop bar 10, and will thus be brought to a dead stop, and in any case it will engage the knob 4 of the lever 3 and force it out of the neutral position thus lowering the T-bar 8 and raising the cup 13, with the ball 11, into the position to which the cup 12 has been brought when the stop bar 10 dropped (Figs. 9 and 10), and when the ball is thus raised it drops from the cup 13 to the cup 12, thus lowering the cup 12 and raising the stop bar 10. The time factor which enters into this mechanism is such that the stop bar is removed from the plane of vibration of the pendulum before the pendulum touches it, if the motion of the pendulum is sufficiently slow to give the ball time to remove the stop bar after the pendulum has acted on the knob 4 and before it acts on the stop bar 10. If the pendulum moves quicker, then it will engage the stop bar momentarily at a point slightly off its neutral position until the ball draws the stop bar out of position and allows the pendulum to assume its neutral position. Should the pendulum swing in the other direction, viz., in the direction in which the knob 4 is displaced, the action will be the same as above described, except that as the pendulum passes the knob 4 the cup 13 will be raised somewhat higher (Fig. 7) but will drop to the position shown in Fig. 8 immediately after the pendulum has passed the knob. It is evident that the knob is always displaced to one side or the other of the neutral or central position except when the pendulum is out of its neutral position and that no difference in operation is developed when the pendulum swings either to one side or to the other.

Referring now to Figs. 11 and 12, the pendulum 15 corresponds with the pendulum 1 and is similarly mounted. The horizontal lever 16 is provided with a knob 17, and engages a double vertical lever 18; these parts corresponding in form and action to the similar parts above described. The lever 18 engages the T-bar 19, which is mounted on the end of a bell-crank lever 20, the other end of which is connected by a bar 21 to the center of the diaphragm 22 of a closed air-tight vessel 23, so that as the T-bar is displaced under the action of the lever 18, as described in the first above mechanism, the diaphragm 22 is pushed inward to displace or compress the air in the vessel 23. Another similar vessel 24 is mounted adjacent to the vessel 23, and is connected thereto by means of a small constricted pipe or passage 25, so that any movement of the diaphragm 22 will move the similar diaphragm 26 of the vessel 24 in the opposite direction, the said movement being however not simultaneous, on account of the smallness of the passage 25. The stop bar 27 corresponds with the stop bar 10 and is mounted in such way that its end is acted on by the diaphragm 26 to raise it out of the path of vibration of the pendulum, or to let it fall thereinto, so that when the lever 18 displaces the T-bar 19 the stop bar 27 is slowly moved out of the plane of vibration of the pendulum and so that if the pendulum swings out of its neutral position, the T-bar 19 is raised and the diaphragm 22 returns to its normal position, thus allowing the diaphragm 26 to return to its normal position and bringing the stop bar 27 into the plane of vibration of the pendulum.

It is evident that many changes may be made in the details and mechanisms described, and I do not wish to confine myself to the specific devices shown, the main idea being to retard or stop the oscillation of the pendulum every time it approaches the neutral position and yet to leave it free to immediately move therefrom in either direction. It is of course understood that the mechanism is constructed so that the parts properly balance and work easily.

Having described my invention, what I claim is:—

1. In a device of the class described, the combination with corrective means for restoring lateral balance in a flying machine; a gravity controlled means controlling said corrective means; and means adapted to retard said gravity controlled means, said retarding means acting on said gravity controlled means only when it has substantially reached its neutral position.

2. In a device of the class described, the combination with corrective means for restoring lateral balance in a flying machine; a gravity-controlled means adapted to be displaced from its neutral position when the lateral balance is disturbed; means connecting said corrective means to said gravity controlled means whereby the displacement of said gravity controlled means will set in operation said corrective means to restore the lateral balance; and means adapted to retard said gravity controlled means, said retarding means acting on said gravity controlled means only when it has substantially reached its neutral position.

3. In a device of the class described, the combination with corrective means for restoring lateral balance in a flying machine; a gravity controlled means adapted to be displaced from its neutral position when the lateral balance is disturbed; means connecting said corrective means to said gravity controlled means whereby the displacement of said gravity controlled means will set in operation said corrective means to restore the lateral balance; means adapted to retard said gravity controlled means as it approaches its neutral position; and time lagging means adapted to withdraw said retarding means after the gravity controlled means has substantially reached its neutral position.

4. In a device of the class described the combination with corrective means for restoring lateral balance in a flying machine; a gravity controlled means adapted to be displaced from its neutral position when the lateral balance is disturbed; means connecting said corrective means with said gravity controlled means whereby the displacement of said gravity controlled means will set in operation said corrective means to restore the lateral balance; a removable stop adapted to be placed in the path of said gravity controlled means at the neutral point thereof when said means has been displaced, a lever adapted to be actuated by said gravity controlled means when it approaches its neutral position; and time lagging means, set in operation by said lever when it is actuated, and adapted to withdraw said stop after the gravity controlled means has substantially reached its neutral position.

5. In a device of the class described the combination with corrective means for restoring lateral balance in a flying machine; a gravity controlled means adapted to be displaced from its neutral position when the lateral balance is disturbed; means connecting said corrective means with said gravity controlled means whereby the displacement of said gravity controlled means will set in operation said corrective means to restore the lateral balance; a stop normally removed from the path of said gravity controlled means when said means is in its neutral position; a lever adapted to be actuated by said gravity controlled means when it leaves or approaches its neutral position; and a time lagging means set in operation by said lever, first to place said stop in the path of the gravity controlled means at its neutral point, and then to withdraw said stop from said position after said means has substantially reached its neutral position.

6. In a device of the class described, the combination with corrective means for restoring lateral balance in a flying machine; a gravity controlled means adapted to be displaced from its neutral position when the lateral balance is disturbed; means connecting said corrective means with said gravity controlled means whereby the displacement of said gravity controlled means will set in operation said corrective means to restore the lateral balance; a removable stop adapted to be placed in the path of said gravity controlled means; and means for operating said removable stop.

7. In a device of the class described, the combination with a corrective means for restoring lateral balance in a flying machine; a gravity controlled means controlling said corrective means; and means adapted to change the velocity of said gravity controlled means, said velocity changing means acting on said gravity controlled means only when it has substantially reached its neutral position.

In testimony whereof I affix my signature in presence of two witnesses.

ROBERT M. THOMPSON.

Witnesses:
Chas. W. Stewart,
G. M. Elliott.